United States Patent Office 2,954,301
Patented Sept. 27, 1960

2,954,301

PROCESS FOR BONDING FRESHLY APPLIED HYDRAULIC CEMENT MATERIALS TO SURFACES

Waclaw Szukiewicz, Snyder, N.Y., assignor to Allied Chemical Corporation, a corporation of New York No Drawing. Filed June 27, 1957, Ser. No. 668,304

5 Claims. (Cl. 117—2)

This invention relates to a process for bonding freshly applied hydraulic cement materials (e.g. Portland cement, magnesium aluminate cement, so-called magnesium oxychloride cement, concretes made from such cements, and plaster of Paris) to surfaces, particularly to old surfaces of a similar character which have become worn, broken up, eroded, cracked, spalled or otherwise deteriorated.

A satisfactory method of bonding freshly applied hydraulic cement materials to old and deteriorated surfaces of similar character has been long needed and much sought prior to this invention. Adhesives capable of bonding together dry hardened concrete surfaces do not as a rule provide serviceable bonds between dry, hard concrete and freshly laid wet concrete after the latter has "set." Two possible reasons for this are: (1) water present in the freshly laid concrete prior to setting prevents formation of a serviceable bond and (2) shrinkage of concrete during setting, although slight, suffices to rupture or weaken any bond formed.

An object of the present invention is to provide a simple, efficient method of bonding freshly applied hydraulic cement materials to old and deteriorated cement surfaces. Another object of the invention is to provide a bond between old and new hydraulic cement surfaces which is stronger than the hydraulic cement itself after it has set. Other objects and advantages of the present invention will be apparent from the following description.

In accordance with the present invention, water-containing hydraulic cement material may be bonded to an old cement surface which comprises coating the old cement surface with a mixture containing a resin-forming catalyst, preferably a tertiary amine, and an adduct of a polyol selected from the group consisting of glyceride esters of hydroxylated fatty acids, polyester-polyols and polyalkylene glycols and an organic polyisocyanate, preferably an arylene diisocyanate, which adduct is prepared by reacting a polyol having a molecular weight in the range of 300 to 2,300 with an amount of organic polyisocyanate sufficient to provide from 1.8 to 4.0, preferably 2.0 to 3.0, isocyanate groups for each hydroxyl group in the polyol, said mixture preferably containing an organic solvent-thinner which is volatile, water-free and unreactive, said adduct, solvent thinner and catalyst in said mixture preferably being in the proportion of 100 parts by weight adduct, 50 to 200 parts by weight solvent and 0.2 to 2 parts by weight catalyst, curing the resulting coating by exposure to the atmosphere for a sufficient length of time to effect evaporation of the volatile solvent and until the coating becomes dry and tacky, thereafter applying fresh water-containing hydraulic cement material to the dry and tacky coating and permitting the water containing hydraulic cement material to set to form a strong bond with the old cement surface.

Bonds between old and new hydraulic cement surfaces (e.g. Portland cement concrete) provided by use of polyurethane "prepolymer," adduct of a polyol and an organic polyisocyanate, compositions of this invention in general have an effective strength under service conditions which is often greater than the effective strength of the hydraulic cement itself. Such bonds have held up on prolonged exposure to service conditions sufficiently severe to break up surfaces of Portland cement concrete. This is very surprising and not to be predicted a priori because it is well known that mixtures of catalyst and polyurethan "prepolymer" of the type used in this invention react with water to liberate carbon dioxide gas which would be expected to form bubbles which would weaken any bond formed. In fact such compositions are reacted in the presence of water to manufacture polyurethane foams which are expanded by carbon dioxide gas formed as a by-product of a reaction between two isocyanate groups and a water molecule, which reaction forms a chain-coupling urea linkage.

The process of this invention has proved useful for re-surfacing concrete pavements broken down by heavy truck traffic, cement floors in chemical plants and laboratories which had become eroded by the action of acid, and plaster walls which had cracked, chipped and crumbled away in various places. Likewise it has proved useful for resetting fixtures (bolts, piping, cement nails, brackets, hangers, doorstops, etc.) which had been embedded in concrete and become loose. The process is applicable to filling, patching, repairing and re-surfacing pavements, highways, airports, sidewalks, driveways, foundations, walls, ceilings and all kinds of structures made from hydraulic cement material. It does not matter whether the spaces to be filled are deep or shallow or regular or irregular in contour. It is well known that use of fresh concrete alone to fill spaces that are shallow in depth and irregular in contour is totally unsatisfactory because little, if any, bond formation occurs between the new concrete and old concrete.

Prior to application of the prepolymer coating, the surfaces should be cleaned to remove loose matter, oil or grease, etc. This may be accomplished by brushing or sweeping to remove loose matter, or by washing (e.g. with a hose where applicable) and allowing to dry, or both. If oil, grease, or similar organic matter is present, it may be removed by toluene, lye or the like. Other than this, extensive preparation of the surface to be cleaned is not necessary. The proportions of prepolymer, solvent thinner and catalyst preferred for most applications are 100 parts prepolymer, 50 to 200 parts solvent and 0.2 to 2 parts catalyst. The prepolymer mixture may be applied by brushing, dipping or spraying. The coated surfaces are allowed to "cure" in the open at ambient temperatures and conditions for a suitable period of time which may vary from 15 minutes to an hour or two. The greater the atmospheric humidity, the faster the coating will cure. When sufficiently cured, the coating has a rather dry and "tacky" feel when touched. When the coating has cured, or within a few hours thereafter, the wet hydraulic cement material is applied and smoothed or finished in the usual manner.

The term "hydraulic cement" is used herein in its usual sense to designate structural materials which are applied in admixture with water and thereafter harden or "set" as a result of physical and chemical changes which consume the water present. It includes Portland cement, magnesium aluminate cement, so-called magnesium oxychloride cement, and gypsum or plaster of Paris.

The polyols suitable for making the prepolymer component of the formulations used in this invention should have molecular weights between 300 and 2,300. Compositions prepared from polyols having molecular weights below 300 do not provide good adhesion. "Prepolymers" prepared from polyols having molecular weights above 2,300 are viscous or solid, difficult to disperse, dissolve or "thin" and tend to gel rapidly. The polyols may contain functional groups, other than hydroxyl groups, which are capable of reacting with isocyanate groups, e.g. carboxyl groups, mercapto groups, primary or secondary amino groups, urethane linkages (which contain reactive hydrogen bonded to nitrogen), etc. However, the reactive hydrogen bearing groups in the polyol should be predominantly hydroxyl groups. Suitable polyols include the following:

(1) Castor oil and other glyceride esters of hydroxylated fatty acids: Castor oil is the preferred polyol. Related materials which are operative include hydrogenated castor oil, glycerine monoricinoleate, glycerine diricinoleate, and the blown drying oils, also referred to "heavy bodied" oils, such as blown soya, tung, poppyseed, hemp seed, or linseed oils, and partial esters of glycerine with "blown" drying oil fatty acids.

(2) Polyester-polyols prepared by copolymerizing low molecular weight polyols and polycarboxylic acids: These materials are prepared by reacting a mixture containing the polycarboxylic acids and polyols in proportions such that a stoichiometric excess of polyol is present to insure that the resulting polyester will have a preponderance of terminal hydroxyl groups over terminal carboxyl groups. Preferably the low molecular weight polyols are predominantly diols, e.g. mono, di or triethylene or propylene glycols, 1,4-butane-doil, diethanolamine, etc. Advantageously a minor amount of a triol such as glycerine, hexane-triol, trimethylol ethane or trimethylol propane may be included. Suitable acids include adipic, succinic, maleic, phthalic, terephthalic, etc.

(3) Polyalkylene glycols such as polyethylene glycols, polypropylene glycols, or mixed polyethylene-polypropylene glycols having molecular weights between 300 and 2,300.

Polyisocyanates suitable for making the prepolymer include, among many others, 2,4 and 2,6-tolylene diisocyanates, diphenylmethane-4,4'-diisocyanate, para and meta phenylene diisocyanate, hexamethylene diisocyanate, 3,3-bitolylene-4,4'-diisocyanate, and 1,5-naphthalene diisocyanate.

The prepolymers are preferably prepared by heating a mixture of the polyol and polyisocyanate to 50–70° C. in an atmosphere of inert gas such as dry nitrogen. It is also possible to prepare them by mixing the polyol and polyisocyanate reactants with the thinner and catalyst, which catalyst will then catalyze the prepolymer-forming reaction as well as the subsequent polyurethane resin-forming reactions. In this method, due care must be taken to avoid harmful physiological effects of free isocyanate if it is appreciably volatile.

The chemical structures of the "prepolymer" adducts include urethane linkages from reaction between terminal isocyanate groups and terminal hydroxyl groups. When the isocyanate group/hydroxyl group ratio of the formulation is between 1.8 and 2.0, inclusive, the terminal groups are hydroxyl groups and/or isocyanate groups. When this ratio is greater than 2.0, the compositions are believed to consist predominantly of a mixture of (1) polyurethanes containing terminal isocyanate groups and (2) excess free isocyanate.

Solvents and thinners should be volatile (organic liquids boiling below 125° C. which readily evaporate when exposed to the atmosphere) and water-free and should not contain reactive hydrogen. Suitable examples include turpentine, benzene, toluene, acetone, methylene chloride, ethyl acetate, etc.

Catalysts capable of accelerating the resin-forming reactions are, in general, bases. Weaker bases such as tertiary amines are preferred because stronger bases are too active. Examples are N-methyl morpholine, adipic acid diester of diethylaminoethanol, diethyl cyclohexylamine, 3-methyl isoquinoline, etc.

Some prepolymers, particularly those from high molecular weight polyester polyols, are prone to gel upon standing. This can be prevented by addition of a small amount of certain mineral acids or material reactive to liberate same, e.g. acyl halides such as acetyl chloride, benzoyl chloride, etc.

Preferably the catalyst is added immediately prior to use because catalyzed formulations will become too resinous to use if allowed to stand too long. The so-called "pot life" of the formulation (period during which catalyzed formulation can be used) varies with the composition but can be controlled by selection of weaker catalysts for the more reactive formulations. The "pot life" for the formulations described in examples below is about 2 hours.

The nature of the reactions leading to the formation of adhesive resin during "cure" of the applied adhesive coating is not known with certainty. Reaction believed to be involved include addition reactions between isocyanate groups to yield uretidinedione linkages and addition reactions between isocyanate groups and urethane linkages to form substituted allophanic ester linkages.

The following examples illustrate the present invention.

EXAMPLE 1

*Preparation of prepolymer from castor oil and diphenylmethane-4,4'-diisocyanate*

The castor oil used in this example ("DB Oil" marketed by Baker Castor Oil Co.) had a low moisture content, an acid value of about 1, and a composition equivalent to about 90% glycerine triricinoleate.

The diphenylmethane-4,4'-diisocyanate used was 99.4% pure and had a solidification point of 37.2° C.

The diisocyanate (470 parts=3.36 mol. equivalents) was melted and heated to 50° C. under an atmosphere of carbon dioxide gas in a closed vessel provided with an agitator and external heating and cooling means. Castor oil (579 parts equivalent to 521 parts or 1.0 mol equivalent of glycerine triricinoleate) was added slowly. After the temperature rose to 65–70° C. from heat of reaction, it was held thereat by cooling. The batch was agitated at 65–70° C. for one hour after addition of the castor oil was completed, cooled to 50° C., and packed out into containers lined with polyethylene.

The product had a calculated composition corresponding to 89.5% adduct of glycerine triricinoleate (1 mol) and diphenylmethane-4,4'-diisocyanate (3 mols); 4.8% excess diphenylmethane-4,4'-diisocyanate; and 5.7% other materials (principally glyceride of fatty acids other than ricinoleic acid).

EXAMPLE 2

*Use of prepolymer to bond a new concrete surface to broken up area of paved roadway*

This example relates to a paved concrete roadway in a large chemical manufacturing plant which had become cracked and broken up in various places under a heavy load of truck traffic.

The cracked and broken up areas (which had been washed fairly clean by a recent rain) were swept until free of loose matter but no other surface preparation was resorted to. (If oil, grease, or similar organic matter had been present it would have been removed.) The cleaned, dry surfaces were then coated by brushing with a solution consisting of 100 parts of the prepolymer described in Example 1, above, 100 parts of toluene, and one part of N-methyl morpholine, which was added immediately prior to use. The coating was allowed to cure for ½ hour in the open until it became dry and tacky. A second coating was then applied and allowed to cure in the same manner. Portland cement (3 parts sand, 1 part Portland cement, water sufficient to make a stiff batter) was then troweled in and smoothed over. The new surfaces were allowed to set for 60 hours before being subjected to traffic. They have remained substantially unimpaired for over six months, during which period areas of pavement adjacent to the re-surfaced areas were broken up. The re-surfaced areas were subjected to salt, calcium chloride and snow plows throughout the winter.

The patched areas were up to ½ inch in depth and ranged from 1 to 4 square feet in area. It is well known that attempts to make such patches with fresh concrete alone give very poor results.

EXAMPLE 3

*Use of prepolymer to bond a new concrete surface to an old eroded concrete floor*

This example concerns a cement floor which was badly eroded to the gravel by acid drippings. The eroded area was not, however, deep enough to hold a new concrete layer. The floor was cleaned to remove loose matter. It was then coated (by brushing) with a solution prepared from 100 parts of the prepolymer described in Example 1, above, 50 parts of toluene, 50 parts of petroleum ether, and 1 part of N-methyl morpholine catalyst, which was added immediately prior to use. The surface was allowed to cure in the open air for 15 minutes, during which time the surface dried and became very tacky. A thin layer of fresh cement was then applied and smoothed with a trowel, using a cement to sand ratio of 1 to 3 parts by volume. After 48 hours the cement set to give a strongly adherent, uniform fresh cement surface. A protective coating of the same prepolymer solution was then applied to improve the resistance of the surface to the action of dilute acids. The floor has remained substantially unimpaired for more than eight months. Without use of the "prepolymer," the new concrete would not have bonded to the old concrete in a satisfactory manner, particularly because of the shallowness of the space to be filled.

EXAMPLE 4

*Use of prepolymer to bond a fresh plaster surface to old plaster*

This example relates to an old painted plaster wall which was cracked and chipped in many places. The wall was wiped free from loose dust and dirt and then coated (by brushing) with a solution consisting of 100 parts of the prepolymer described in Example 1, above, 50 parts of toluene, 50 parts of C. P. (water-free) acetone, and 1 part of N-methyl morpholine catalyst, which was added immediately prior to use. The coated surface was allowed to cure under atmospheric conditions for 15 to 25 minutes. A thin "wash-out" layer of plaster was then applied and smoothed with a trowel; an aqueous paste of a mixture of 45% plaster of Paris and 55% of lime was used. The resulting smooth adherent plaster surface was allowed to "set" for 24 hours and was then painted. It has remained substantially unimpaired for more than nine months. Without use of the "prepolymer" the plaster would not have bonded at all to the painted portions of the wall and would not have bonded well at other portions.

EXAMPLE 5

*Use of the prepolymer composition to set loose fixtures in concrete*

By the process of this invention, loose fixtures partially embedded in concrete may be easily and firmly re-set therein without enlarging the hole. Such fixtures include bolts, cement nails, brackets, hangers, and door stops. The present representative example relates to a doorstop which had become loose from repeated impacts of the door. After removal of the doorstop, the surfaces of the resulting hole and of the embedded part of the doorstop were coated with a solution consisting of 100 parts of the prepolymer described in Example 1, supra, 50 parts of toluene, 50 parts of methylene chloride and 1 part of N-methyl morpholine catalyst, which was added immediately prior to use. After 15 minutes of open cure for the coatings, the doorstop was set firmly in the hole which was then filled to the surface with fresh cement. After 48 hours, the doorstop was securely fixed in place and has withstood the impact of the door in use satisfactorily for more than nine months. This result could not have been obtained without the use of the "prepolymer" adhesive.

In my application Serial No. 668,305, filed June 27, 1957, now Patent No. 2,902,388, entitled "Hydraulic Cement—Polyurethane Resin Compositions Useful for Coating, Sealing, Patching and Surfacing," is described compositions of matter comprising a mixture of hydraulic cement and the reaction product of an organic polyisocyanate and a polyol for coating, sealing, patching and surfacing.

Although certain preferred embodiments of the invention have been disclosed for purpose of illustration, it will be evident that various changes and modifications may be made therein without departing from the scope and spirit of the invention.

I claim:

1. A process for bonding freshly applied hydraulic cement material to an old cement surface which comprises coating the old cement surface with a mixture containing an adduct prepared by reacting a polyol having a molecular weight in the range of 300–2,300 with an organic polyisocyanate in an amount of 1.8 to 40 isocyanate groups for each hydroxyl group in the polyol, and a resin-forming catalyst, curing the resulting coating by exposure to the atmosphere until the coating becomes dry and tacky, applying fresh water-containing hydraulic cement material to the dry and tacky coating and permitting the water-containing hydraulic material to form a strong bond with the old cement surface.

2. A process for bonding freshly applied hydraulic cement material to an old cement surface which comprises coating the old cement surface with a mixture containing an adduct prepared by reacting a glyceride ester of hydroxylated fatty acid having a molecular weight in the range of 300–2,300 with an arylene diisocyanate in an amount of 2.0 to 3.0 isocyanate groups for each hydroxyl group in the glyceride ester of hydroxylated fatty acid, and a tertiary amine as a resin-forming catalyst, and an organic solvent which is volatile, water-free and unreactive, said adduct, solvent and catalyst in said mixture being in the proportion of 100 parts by weight adduct, 50 to 200 parts by weight solvent and 0.2 to 2 parts by weight catalyst, curing the resulting coating by exposure to the atmosphere for a sufficient length of time to effect evaporation of the volatile solvent and until the coating becomes dry and tacky, applying fresh water-containing hydraulic cement material to the dry and tacky coating and permitting the water-containing hydraulic material to form a strong bond with the old cement surface.

3. A process for bonding freshly applied hydraulic cement material to an old cement surface which comprises coating the old cement surface with a mixture containing an adduct prepared by reacting a polyester-polyol having a molecular weight in the range of 300–2,300 with an arylene diisocyanate in an amount of 2.0 to 3.0 isocyanate groups for each hydroxyl group in the polyester-polyol, and a tertiary amine as a resin-forming catalyst, and an organic solvent which is volatile, water-free and unreactive, said adduct, solvent and catalyst in said mixture being in the proportion of 100 parts by weight adduct, 50 to 200 parts by weight solvent and 0.2 to 2 parts by weight catalyst, curing the resulting coating by exposure to the atmosphere for a sufficient length of time to effect evaporation of the volatile solvent and until the coating becomes dry and tacky, applying fresh water-containing hydraulic cement material to the dry and tacky coating and permitting the water-containing hydraulic material to form a strong bond with the old cement surface.

4. A process for bonding freshly applied hydraulic cement material to an old cement surface which comprises coating the old cement surface with a mixture containing an adduct prepared by reacting a polyalkylene glycol having a molecular weight in the range of 300–

2,300 with an arylene diisocyanate in an amount of 2.0 to 3.0 isocyanate groups for each hydroxyl group in the polyalkylene glycol, and a tertiary amine as a resin-forming catalyst, and an organic solvent which is volatile, water-free and unreactive, said adduct, solvent and catalyst in said mixture being in the proportion of 100 parts by weight adduct, 50 to 200 parts by weight solvent and 0.2 to 2 parts by weight catalyst, curing the resulting coating by exposure to the atmosphere for a sufficient length of time to effect evaporation of the volatile solvent and until the coating becomes dry and tacky, applying fresh water-containing hydraulic cement material to the dry and tacky coating and permitting the water-containing hydraulic material to form a strong bond with the old cement surface.

5. A process for bonding freshly applied hydraulic cement material to an old cement surface which comprises coating the old cement surface with a mixture containing an adduct prepared by reacting castor oil with diphenylmethane-4,4'-diisocyanate in an amount of 2.0 to 3.0 ioscyanate groups for each hydroxyl group in the castor oil, and a tertiary amine as a resin-forming catalyst, and an organic solvent which is volatile, water-free and unreactive, said adduct, solvent and catalyst in said mixture being in the proportion of 100 parts by weight adduct, 50 to 200 parts by weight solvent and 0.2 to 2 parts by weight catalyst, curing the resulting coating by exposure to the atmosphere for a sufficient length of time to effect evaporation of the volatile solvent and until the coating becomes dry and tacky, applying fresh water-containing Portland hydraulic cement material to the dry and tacky coating and permitting the water-containing hydraulic material to form a strong bond with the old cement surface.

References Cited in the file of this patent
UNITED STATES PATENTS

| | | |
|---|---|---|
| 2,488,251 | Wood | Nov. 15, 1949 |
| 2,650,212 | Windemuth | Aug. 25, 1953 |
| 2,760,885 | Larsen | Aug. 28, 1956 |

FOREIGN PATENTS

| | | |
|---|---|---|
| 167,675 | Australia | Sept. 24, 1953 |

OTHER REFERENCES

Monsanto Technical Bulletin No. P–125, Isocyanates, Oct. 1, 1951, Phosphate Div., St. Louis 4, Mo. (Copy in Div. 60.)

Stevenson: Rubber Age, vol. 77, No. 1, April 1955. (Copy in Div. 60.)